United States Patent
Williams et al.

(10) Patent No.: US 7,436,290 B2
(45) Date of Patent: Oct. 14, 2008

(54) SENSOR DISCRIMINATION APPARATUS, SYSTEM, AND METHOD

(75) Inventors: Kyle Shawn Williams, Howell, MI (US); Joseph Funyak, Rochester Hills, MI (US)

(73) Assignee: Infineon Technologies AG, Munich (DE)

( * ) Notice: Subject to any disclaimer, the term of this patent is extended or adjusted under 35 U.S.C. 154(b) by 429 days.

(21) Appl. No.: 11/204,692

(22) Filed: Aug. 16, 2005

(65) Prior Publication Data

US 2007/0040659 A1 Feb. 22, 2007

(51) Int. Cl.
*B60Q 1/00* (2006.01)
(52) U.S. Cl. .......................... 340/438; 361/59
(58) Field of Classification Search ................. 340/438, 340/648; 361/42, 59, 78
See application file for complete search history.

(56) References Cited

U.S. PATENT DOCUMENTS

| | | | | |
|---|---|---|---|---|
| 4,339,701 A | * | 7/1982 | Pritchard | 318/696 |
| 5,448,175 A | * | 9/1995 | Nishibe et al. | 324/546 |
| 5,910,875 A | * | 6/1999 | Tian et al. | 361/78 |
| 6,081,123 A | * | 6/2000 | Kasbarian et al. | 361/59 |
| 6,850,213 B2 | * | 2/2005 | Marcotte | 345/60 |
| 7,068,480 B2 | * | 6/2006 | Wong et al. | 361/42 |
| 2004/0042137 A1 | * | 3/2004 | Wong et al. | 361/42 |
| 2006/0166706 A1 | * | 7/2006 | Dwelley et al. | 455/572 |

* cited by examiner

*Primary Examiner*—John A Tweel, Jr.
(74) *Attorney, Agent, or Firm*—Kacvinsky LLC (57) ABSTRACT

A first and second node configured to couple to a load. A current source is adapted to drive a first current to the load through at least one of the first and second nodes. A first switch is coupled to the at least one of the first and second nodes. The first switch is adapted to interrupt the first current. A sense circuit is configured to monitor whether a second current is provided by the load after the first current is interrupted. The sense circuit provides an output that corresponds to a value of the second current and that indicates a type of the load.

27 Claims, 9 Drawing Sheets

SENSOR DISCRIMINATION APPARATUS, SYSTEM, AND METHOD

BACKGROUND

Sensors are commonly used in many types of applications to detect the physical attributes of systems. For example, in mechanical systems, sensors are used to detect component displacement, rotation, speed, and position. In automotive systems, sensors are employed to detect crank shaft rotation and position, engine speed and position, gear speed, automotive ignition system functions, and direction and rotation speed for electronically controlled transmissions. Sensors are also used in Anti-Lock Brake Systems (ABS) and traction control systems, and other types of applications such as oil pressure and internal temperature measurement.

Sensors are generally connected to an electronic module with appropriate interface circuits to couple the sensor's analog or digital output signals to the module. Generally, sensors based on different technologies may be used to perform a given sensing function. Electrical output signals provided by the sensors will depend on the underlying technology used to manufacture the sensor, resulting in unique signal interface and conditioning circuit requirements for each sensor type. In applications where any one of multiple types of sensors may be used to perform a single sensing function, electronic modules must be able to provide multiple input connections to multiple interface circuits in order to accommodate the different sensor types.

Figure 1:
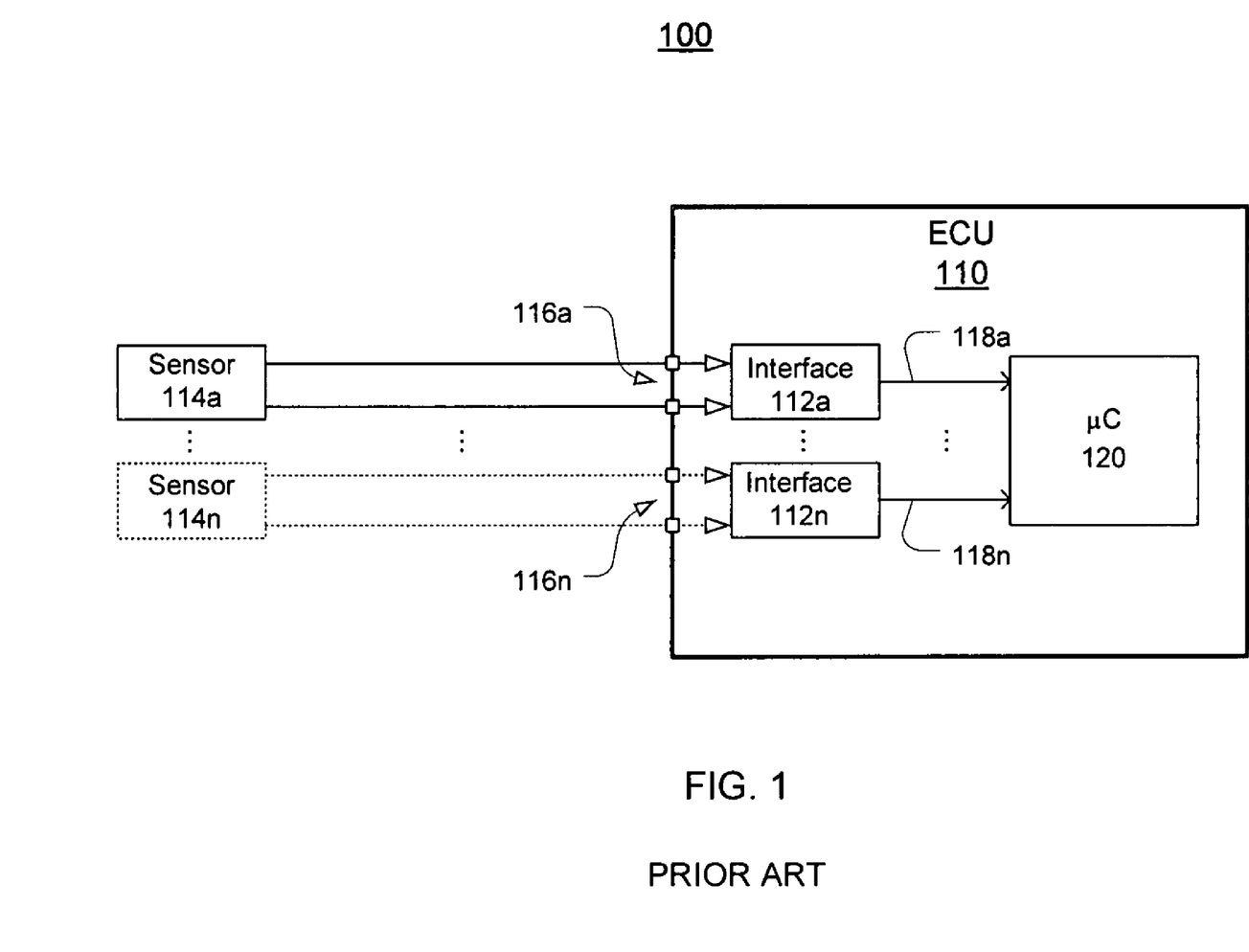
FIG. 1 illustrates a prior art detection system 100.

One example of such a prior art system is illustrated in FIG. 1. In FIG. 1, system 100 includes an electronic control unit (ECU) 110 that includes multiple interfaces 112$a$-112$n$. In this example, while only one sensor 114 (e.g., one of sensor 114$a$-114$n$) is used, ECU 110 must include multiple interfaces 112$a$-112$n$ to accommodate all of the possible sensors 114$a$-114$n$ that could be used to perform the sensing function. ECU 110 must also be programmed to recognize which one of the sensors 114$a$-114$n$ are coupled to connectors 116$a$-116$n$.

SUMMARY OF INVENTION

In one embodiment, an apparatus comprises a first and second node which are configured to couple to a load. A current source is adapted to drive a first current to the load through at least one of the first and second nodes. A first switch is coupled to at least one of the first and second nodes and is adapted to interrupt the first current. A sense circuit is configured to monitor whether a second current is provided by the load after the first current is interrupted. The sense circuit provides an output that corresponds to a value of the second current and that indicates a type of the load.

DETAILED DESCRIPTION

Figure 2:
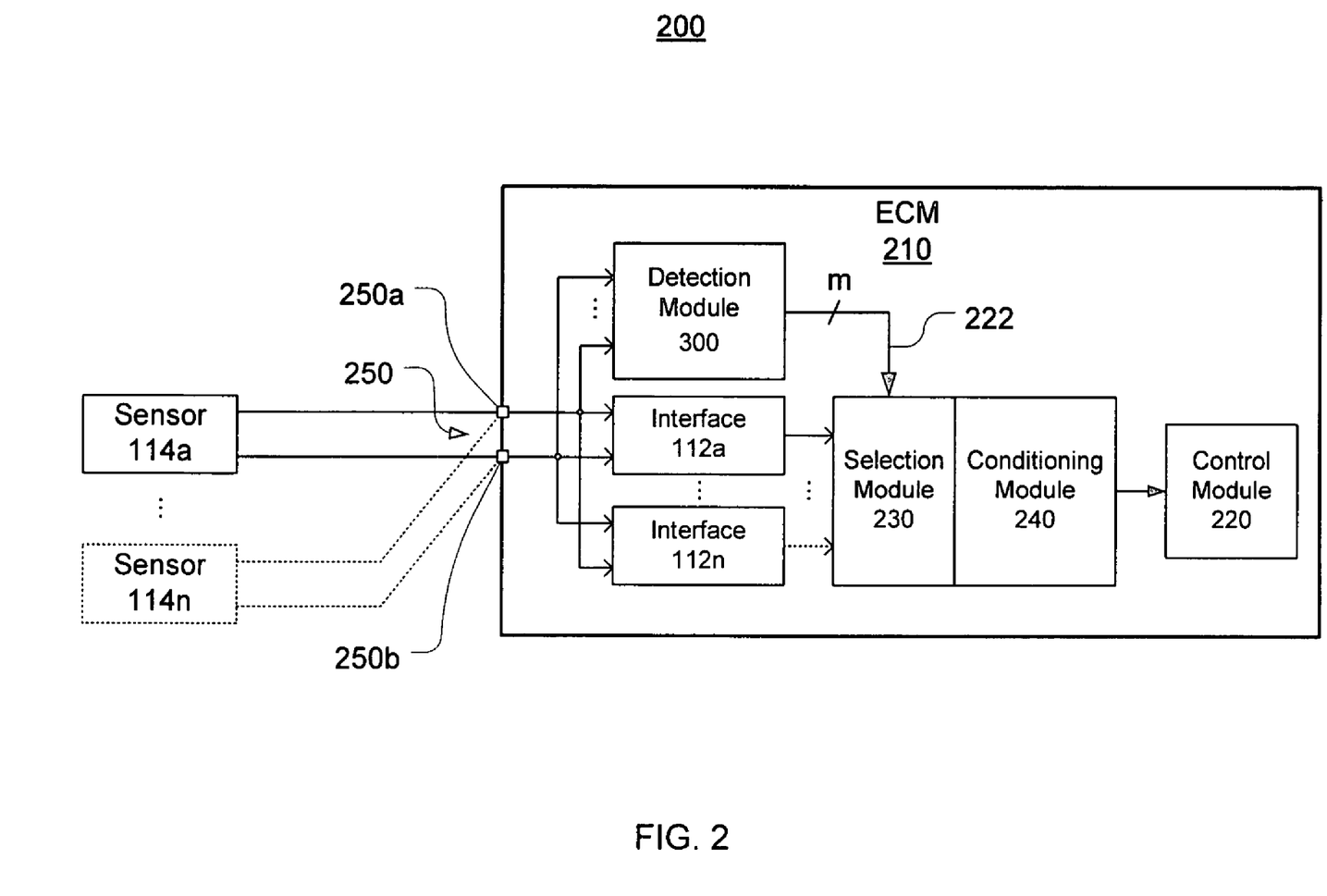
FIG. 2 illustrates one embodiment of a detection system 200.

FIG. 2 illustrates one embodiment of a detection system 200 comprising an electronic control module (ECM) 210 adapted to connect to a load, such as, for example, any one of multiple sensors 114$a$-114$n$ via a port 250. In various embodiments, any suitable number of sensors 114$a$-114$n$ can be used, such as one or more than one. In various embodiments, port 250 may be an input port, an output port or a bi-directional input/output port. In one embodiment, port 250 may be a single port or can be any suitable number of multiple ports, for example. In one embodiment, port 250 comprises a first pin 250$a$ and a second pin 250$b$. In one embodiment, ECM 210 comprises multiple interfaces 112$a$-112$n$ to couple signals from any one of multiple sensors 114$a$-114$n$, respectively, to conditioning module 240 via selection module 230. In the illustrated embodiment, ECM 210 may comprise a detection module 300 which detects the type and underlying technology of a sensor that may be coupled to port 250. In the illustrated embodiment, once detection module 300 detects the sensor type, it provides a word "m" to selection module 230 via control line 222. In other embodiments, the word "m" may comprise one or more serial or parallel bits to select the appropriate interface 112$a$-112$n$ for the particular sensor 114$a$-114$n$ connected to port 250. The embodiments, however, are not limited in this context.

In the illustrated embodiment, detection module 300 detects the type of sensor 114$a$-114$n$ coupled to port 250 and provides the control word "m" to selection module 230 via control line 222 to couple the detected sensor 114$a$-114$n$ to conditioning module 240. In one embodiment, selection module 230 comprises one or more digital or analog switches that each includes one or more inputs coupled to interfaces 112$a$-112$n$ and one or more outputs coupled to conditioning module 240. In the illustrated embodiment, detection module 300 controls which one of the multiple interfaces 112$a$-112$n$ is coupled to conditioning module 240. For example, any one of interfaces 112$a$-112$n$ may be selectively coupled to conditioning module 240 based on which sensor 114$a$-114$n$ type and underlying technology is detected by detection module 300. Once detection module 300 detects the type of sensor 114$a$-114$n$ coupled to port 250, it automatically couples the appropriate interface 112$a$-112$n$ to conditioning module 240 by applying word "m" to control line 222. Accordingly, the particular sensor 114$a$-114$n$ type coupled to port 250 is then coupled via the appropriate corresponding interface 112$a$-112$n$ to conditioning module 240 via selection module 230 and then to control module 220 for further processing. In one embodiment, conditioning module 240 may comprise a filter or other signal conditioning circuitry that provides appropriate digital signals to control module 220 that correspond to the input signals at port 250. In one embodiment, conditioning module 240 comprises an analog-to-digital (A/D) converter. In one embodiment, interface 112$a$-112$n$ provides any suitable form of signal conditioning that corresponds to the sensor 114$a$-114$n$ type that is coupled to port 250. The embodiments, however, are not limited in this context.

In one embodiment, sensor 114$a$ is a Hall sensor based on the Hall effect and sensor 114$n$ is a variable reluctance sensor (VRS sensor). Either sensor 114$a$ or 114$n$ may be used to acquire positional and frequency information from rotating systems and may sense such variables as an object's rotation, displacement, speed, and position. In one embodiment, Hall sensor 114a and VRS sensor 114n are used in automotive systems to sense physical attributes associated with a vehicle such as engine speed and position, transmission speed and direction, vehicle speed, and wheel speed for ABS and traction control systems. The embodiments, however, are not limited in this context.

In various embodiments Hall sensor 114a may be used for contactless sensing of a target object that comprises an external magnet or a ferrous object, and may also be used to sense the direction, linear or rotational displacement, speed and position of gear teeth within the target object. In one embodiment, Hall sensor 114a comprises a small semiconductive platelet and an electric conductor. In its embodiment, a "Hall" voltage is generated transversely to a current flow direction within the conductor if a magnetic field is applied perpendicularly to the conductor. Due to its physical structure, a Hall sensor has negligible inductance. Any inductance that may be attributed to the Hall sensor is due to parasitic inductances associated with the conductor or to the electrical interconnects associated with the Hall sensor. Accordingly, to an external system such as detection module 300, the Hall sensor presents a negligible amount of inductance when coupled between first pin 250a and second pin 250b of port 250. The embodiments, however, are not limited in this context.

In one embodiment, VRS sensor 114n is used to sense an object's gear-teeth direction, speed, position, and linear or rotational displacement. Unlike Hall sensor 114a, however, the physical structure of VRS sensor 114n may comprise a permanent magnet surrounded by a winding of wire. Any movement of the target object near VRS sensor 114n produces changes in the magnetic flux of VRS sensor 114n. Thus, due to its physical structure, to an external system such as detection module 300, VRS sensor 114n presents a significant amount of inductance when coupled between first pin 250a and second 250b. The embodiments, however, are not limited in this context.

Although Hall sensor 114a and VRS sensor 114n may be used in similar applications, each sensor 114a and 114n produces a different type of electrical signal requiring different compatible interfaces 112a and 112n to couple the signal to signal conditioning module 240. In the illustrated embodiments, detection module 300 senses the type of sensor 114a or 114n coupled to port 250 so that an appropriate interface 112a or 112n, respectively, may be selected to condition and process the signal. In one embodiment, detection module 300 detects whether the sensor coupled to port 250 is a Hall sensor 114a or a VRS sensor 114n, and connects conditioning module 240 to the appropriate interface 112a or 112n by providing the corresponding control word "in" to selection module 230 via control line 222. Control module 220 then receives the appropriate signal for further processing. The embodiments, however, are not limited in this context.

Figure 3:
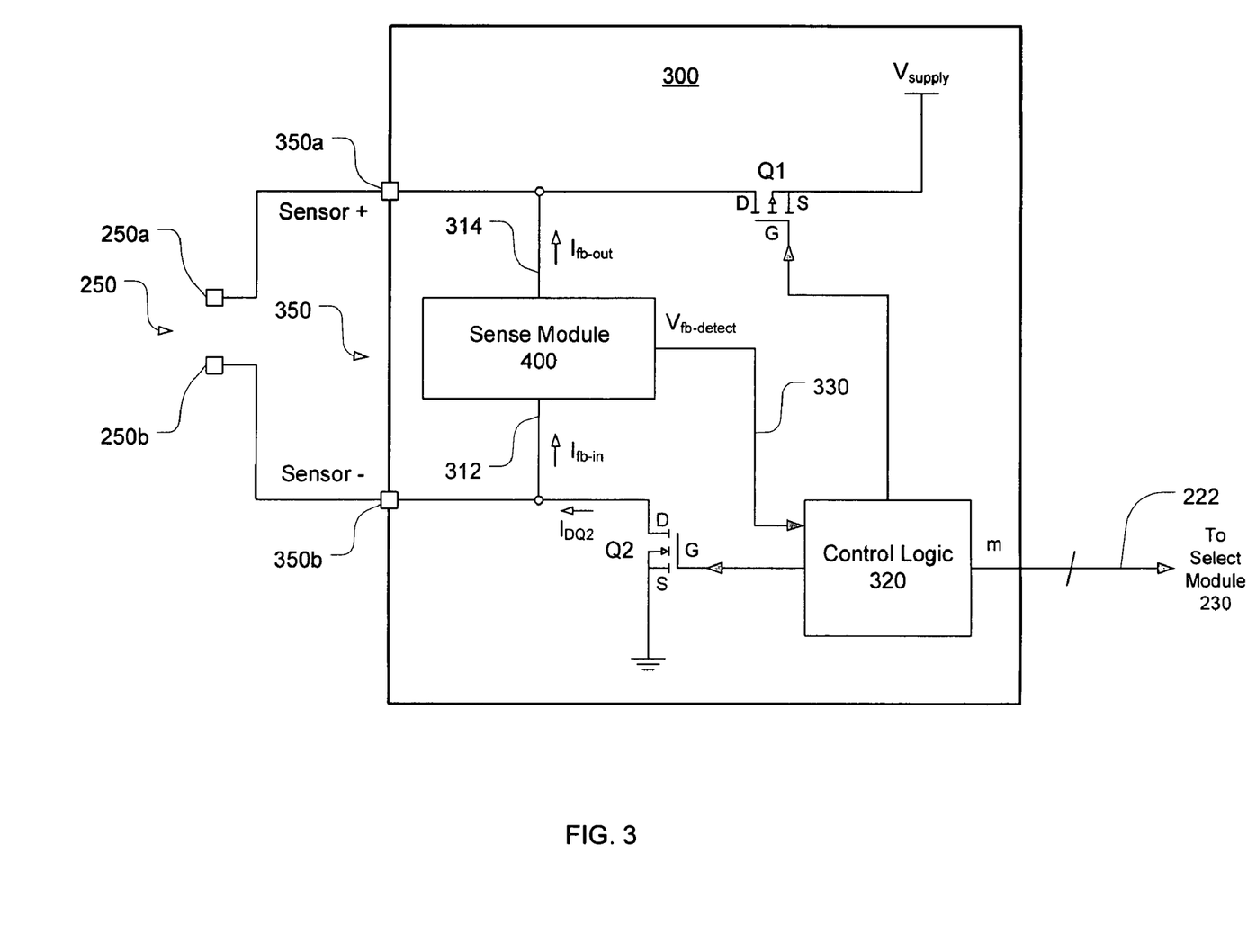
FIG. 3 illustrates one embodiment of a detection module 300.

FIG. 3 illustrates one embodiment of detection module 300. In the illustrated embodiment, detection module 300 comprises a port 350 that is coupled to port 250. Port 350 receives signals from a load, such as, for example, any one of sensors 114a-114n. In one embodiment, detection module 300 is adapted to receive signals from either Hall sensor 114a or VRS sensor 114n, among other types of sensors. In one embodiment, the positive side of the signal is applied to sensor+ node 350a and the negative side of the signal is applied to sensor− node 350b. In one embodiment, detection module 300 comprises a sense module 400 comprising a first sense node 312, a second sense node 314, and an output node 330. First sense node 312 is coupled to sensor− node 350b and to drain terminal D of transistor Q2. Second sense node 314 is coupled to sensor+node 350a and to drain terminal D of transistor Q1. Control logic 320 controls the operation of transistors Q1 and Q2. In one embodiment, control logic 320 applies appropriate electrical control pulses to gate terminals G of transistors Q1 and Q2. It can be appreciated that no current flows into sense node 312 ($I_{fb-in}$) or out of sense node 314 ($I_{fb-out}$) when Q1 and Q2 are off. In one embodiment, output node 330 is coupled to control logic 320 to provide a detection signal that corresponds to the type of sensor detected at input node 350. In the various embodiments, the detection signal provided at output node 330 can be any suitable type of signal. In various embodiments, the detection signal may be a voltage level threshold, logic "1" or logic "0" voltage level, a current source or sink, a resistance or impedance change, a voltage having different polarities, or other suitable types of signals, all of which indicate the type of sensor that is coupled to port 350. In one embodiment, the detection signal is a value of voltage $V_{fb-detect}$, where the value being above or below a threshold value indicates the type of sensor coupled to port 350. In one embodiment, voltage $V_{fb-detect}$ changes polarity or transitions between a logic "0" and a logic "1" voltage level to indicate the type of sensor coupled to port 350. In one embodiment, the detection signal is a time period of voltage $V_{fb-detect}$, where the length of the time period indicates the type of sensor coupled to port 350. Based on detection signal voltage $V_{fb-detect}$ or time period of $V_{fb-detect}$, control logic 320 provides an appropriate output control word "m" to selection module 230 via control line 222 to couple either sensor 114a or sensor 114n to conditioning module 240 through the appropriate interface 112a or 112n. The embodiments, however, are not limited in this context.

Figure 4:
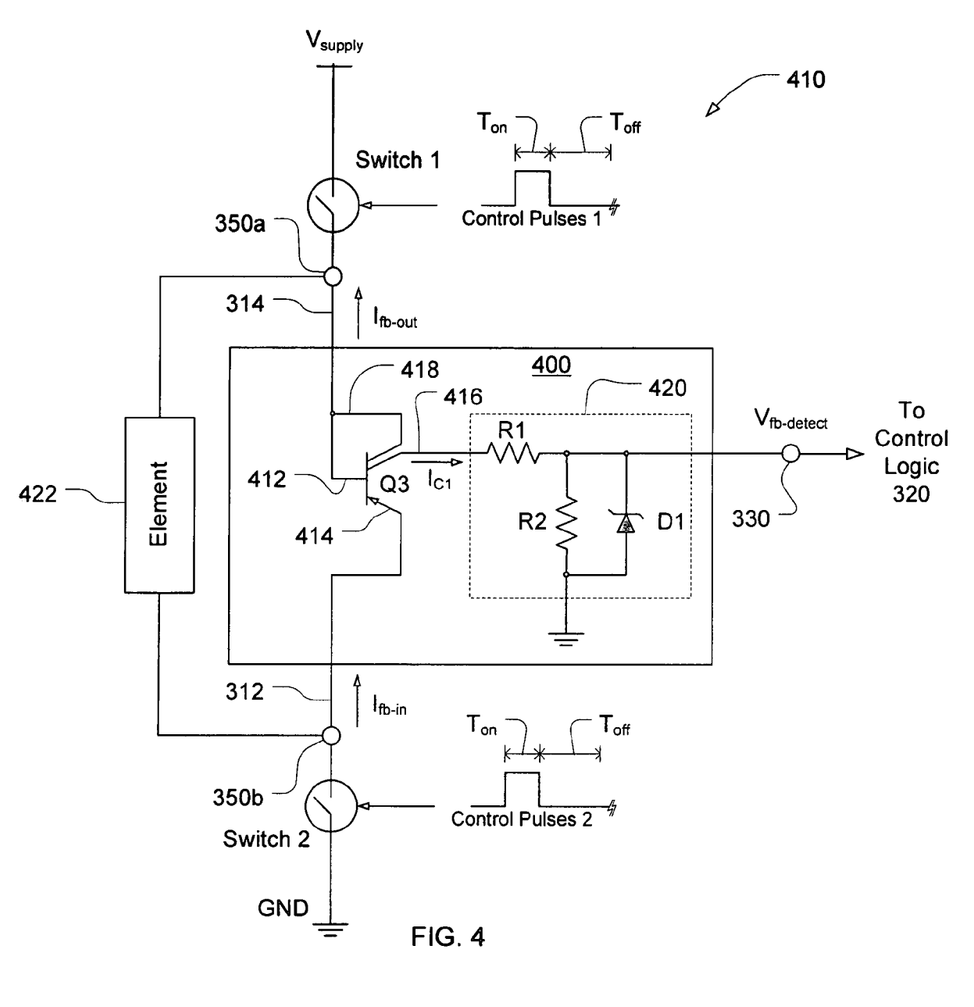
FIG. 4 illustrates one embodiment of a sense module 400 arranged in system 410.

In one embodiment, sense module 400 comprises a flyback sensing circuit that detects the presence of a sensor based on the inductive properties of the sensor. In one embodiment, the flyback sensing circuit detects flyback current generated by an inductive load when a driver stops driving the inductive load. For example, after Q1 and Q2 are turned "on" to drive an inductive load connected to port 250, if any one or both of Q1 or Q2 are turned "off," the inductive load generates a flyback current that is driven back into sensor+node 350a. In one embodiment, sense module 400 detects this flyback current. Those skilled in the art will appreciate that transistors Q1 and Q2 may be implemented using any suitable type of component such as bipolar junction transistors (BJT), diodes, triodes on silicon controlled rectifiers (SCR). Embodiments of sense module 400 may be implemented in a variety of configurations that is based on the type of sensor 114a-114n used. Embodiments of control logic 320 may be implemented in various embodiments using a variety of configurations that include a processor, controller, state machine, logic, logic array, or a programmable logic array.

FIG. 4 illustrates one embodiment of sense module 400. In this embodiment, sense module 400 comprises a flyback sensing circuit that senses whether a load such as sensor element 422 has a significant inductance. In various embodiments, sensor element 422 corresponds to any suitable number of sensors 114a-114n. In one embodiment, sense module 400 discriminates between a highly inductive sensor element 422 (e.g., VRS sensor 114n) and a negligibly inductive sensor element 422 (e.g., Hall-effect sensor 114a). In one embodiment, VRS sensor 114n has a significant amount of inherent inductance due to its physical structure, and Hall sensor 114a has a negligible amount of inductance due to its physical structure. In one embodiment, sense module 400 discriminates between sensor elements 422 having different inductance values above a minimum threshold inductance. The embodiments, however, are not limited in this context.

In one embodiment, sense module 400 comprises a current source, such as transistor Q3, to implement one embodiment of a flyback sensing circuit. In this embodiment, transistor Q3 is adapted to discriminate between a sensor element 422 that has significant inductance and a sensor element 422 that has negligible or no inductance and various inductance values in between. In one embodiment, transistor Q3 comprises a base 412, an emitter 414, a first collector 416, and a second collector 418. First collector 416 is coupled to an electrical circuit network 420, which in one embodiment, comprises resistors R1 and R2 connected in series and diode D1 connected in parallel with resistor R2. In other embodiments, electrical network 420 includes any suitable interconnection of electrical components such as resistors, inductors, capacitors, diodes, switches, and transistors. In the illustrated embodiment, diode D1 is connected to output node 330, second collector 418 is connected to base 412 and second sense node 314, and emitter 414 is connected to first sense node 312. Switch 1 is connected between second sense node 314 and supply voltage $V_{supply}$. In various embodiments, switch 1 is a transistor such as transistor Q1 (FIG. 3) or is any suitable form of transistor Q1 as previously discussed. In the illustrated embodiments, switch 1 is controlled by control pulses 1 applied by control logic 320. In various embodiments, switch 2 is coupled between first sense node 312 and ground (GND). In various embodiments, switch 2 is a transistor such as transistor Q2 (FIG. 3), or is any suitable form of transistor Q2 as previously discussed. In the illustrated embodiment, switch 2 may be controlled by control pulses 2 applied by control logic 320. As previously discussed, any one of sensors 114a-114n may be coupled between nodes 350a and 350b. In various embodiments, element 422 represents any one of sensors 114a-114n that may be coupled between nodes 350a and 350b. In one embodiment, element 422 is a VRS sensor 114n that presents a significant amount of inductance to sense module 400. In one embodiment, element 422 is a Hall sensor 114a, that presents a negligible amount of inductance to sense module 400. In other embodiments, element 422 is other suitable types of sensors with various inductance values.

An illustration of one embodiment of the operation of sense module 400 is described by way of the following example. Accordingly, assume that element 422 is VRS sensor 114n that comprises a significant amount of inductance. To begin the detection process, switches 1 and 2 (e.g., Q1 and Q2, respectively) are turned "on" by control pulses 1 and control pulses 2, respectively, for a period $T_{on}$. After period $T_{on}$ switch 2 is turned "off" for a period $T_{off}$. In one embodiment, period $T_{off}$ is selected to allow the waveform at output node 330 to settle. In one embodiment, this is referred to as a filter time. In other embodiments, $T_{off}$ can be any suitable value such as a value greater than zero. In the illustrated embodiment, when switch 2 is turned "off," flyback currents $I_{fb\text{-}out}$ and $I_{fb\text{-}in}$ are driven by the inductive load presented by VRS sensor 114n back into sense module 400. Because element 422 comprises a significant amount of inductance, flyback currents $I_{fb\text{-}out}$ and $I_{fb\text{-}in}$ will be significant. Accordingly, in response to flyback current $I_{fb\text{-}out}$, current $I_{C1}$ is driven by first collector 416 through series resistors R1 and R2 and produces a voltage at output node 330. If current $I_{C1}$ is driven for at least a threshold minimum time period $T_{detect}$ after switch 2 is turned "off," then detection voltage $V_{fb\text{-}detect}$ is generated at output node 330 for time period $T_{detect}$ which indicates to control logic 320 that element 422 is VRS sensor 114n. In one embodiment, output voltage $V_{fb\ detect}$ is regulated by diode D1 and is clamped by Q3. For example, when switch 1 is on and switch 2 is off, $V_{fb\text{-}detect}$ is equal to $V_{supply}$.

When switch 2 is turned "off," the voltage at node 350b tends to increase rapidly well above the supply voltage due to flyback currents $I_{fb\text{-}in}$ and $f_{fb\text{-}out}$. In the illustrated embodiment, transistor Q3 includes a second collector 418 which is coupled to base 412 and acts as a clamping diode when $I_{fb\text{-}out}$ turns transistor Q3 on. Thus, when sense module 400 operates in flyback mode, Q3 clamps the voltage at node 350b to one diode voltage drop (i.e., 0.7 V) above $V_{supply}$. The embodiments, however, are not limited in this context.

In various embodiments, element 422 may correspond to any one of sensors 114a-114n where each sensor may have a different inductance value. Current $I_{C1}$ is driven for different time periods $T_{detect}$ after switch 2 is turned "off" based on different corresponding inductances of sensors 114a-114n. Accordingly, different detection voltages $V_{fb\text{-}detect}$ are generated at output node 330 for different time periods $T_{detect}$ which indicates to control logic 320 that element 422 is any one of multiple sensors 114a-114n having multiple inductance values. Thus, there may be multiple time periods $T_{detect}$ that correspond to multiple types of sensors 114a-114n having different inductances. In other words, the greater the inductance, the longer the time period $T_{detect}$ that the collector current $I_{C1}$ is driven by flyback currents $I_{fb\text{-}out}$ and $I_{fb\text{-}in}$. For each time period $T_{detect}$ after switch 2 is turned "off," then a corresponding different detection voltage $V_{fb\text{-}detect}$ is generated at output node 330 which indicates to control logic 320 that element 422 is one of multiple sensors 114a-114n with different inductances. Thus, the sense module 400 can distinguish between multiple sensor types 114a-114n by using different $T_{detect}$ time periods.

In another exemplary embodiment, element 422 is a Hall sensor 114a that has a negligible inductance. Accordingly, flyback currents $I_{fb\text{-}out}$ and $I_{fb\text{-}in}$ are insignificant. Therefore, if element 422 with a negligible inductance is connected between nodes 350a and 350b, there is little or no flyback current. Is this embodiment, little or no $I_{fb\text{-}out}$ and $I_{fb\text{-}in}$ currents will be conducted by sense circuit 400. In this embodiment, Q3 will not turn on and collector current $I_{C1}$ is not driven by first collector 416 during the Toff filter period. If little or no current is driven by transistor Q3, then little or no voltage develops at output node 330. In this embodiment, the voltage at output node 330 is much lower than a suitable minimum threshold voltage which indicates that a Hall sensor or other suitable type of sensor that has a negligible inductance is coupled between nodes 350a and 350b. In other embodiments, collector current $I_{C1}$ is not present for a minimum threshold time period $T_{detect}$ and also indicates that a Hall sensor or other suitable type of sensor that has a negligible inductance is coupled between nodes 350a and 350b. The embodiments, however, are not limited in this context.

Figure 5:
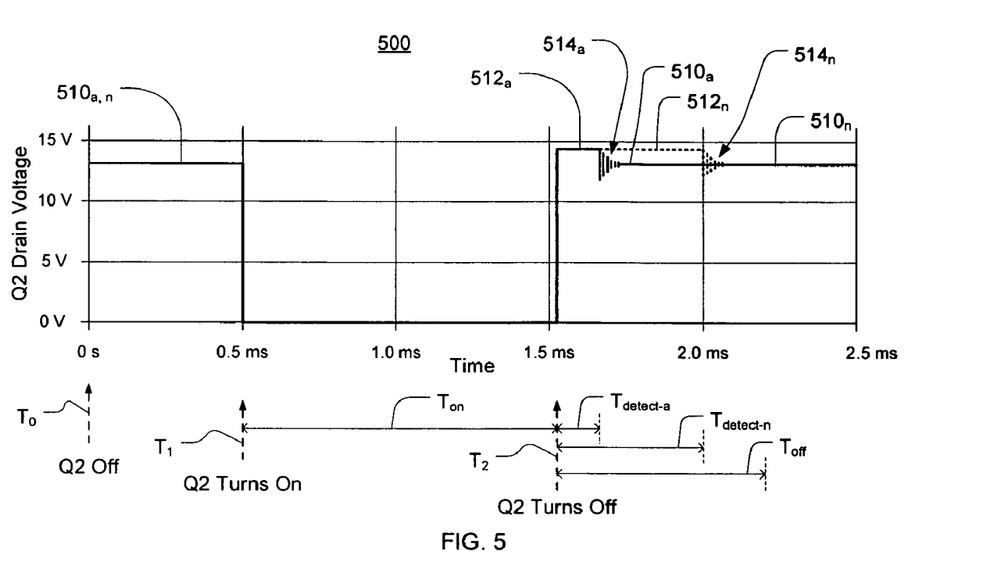
FIG. 5 graphically illustrates a waveform 500 associated with one embodiment of detection module 300.

FIG. 5 graphically illustrates a waveform 500 associated with one embodiment of the operation of detection module 300 as shown in FIG. 3. With reference now to FIGS. 3-5, waveform 500 illustrates the voltage at drain D of Q2 as a function of time. When transistor Q2 is in the "off" state during the period between time $T_0$ and $T_1$, drain voltage $510a$ at the drain D terminal of Q2 (sensor– node 350b) is approximately equal to the supply voltage $V_{supply}$. In one embodiment, the supply voltage is approximately 14 V. In other embodiments, the supply voltage can be any suitable value. In the illustrated embodiment, for an element 422 having a first inductance, when Q2 is turned "on" at $T_1$, drain voltage $510_a$ drops to nearly the ground potential. Drain voltage $510_a$ remains at this ground level potential during period $T_{on}$ until Q2 is turned "off" at $T_2$. At time $T_2$, drain voltage $512_a$ begins to rise rapidly beyond the supply voltage of 14 V for a period of time due to the inductive flyback action at the drain terminal D of Q2. Q2 is then maintained in the "off" mode for at least the time period $T_{off}$. In the illustrated embodiment, transistor Q3 (FIG. 4) clamps drain voltage $512_a$ to 14.7 V (e.g., one diode voltage drop above the supply voltage) until the voltage $514_a$ stabilizes to the steady state level of the supply voltage $510_a$. Those skilled in the art will appreciate that element 422 pulls up node 350b to the supply voltage $510_a$. The embodiments, however, are not limited in this context.

Further, in the illustrated embodiment, for an element 422 having a second inductance, when Q2 is turned "on" at $T_1$, drain voltage $510_n$ drops to nearly the ground potential. Drain voltage $510_n$ remains at this ground level potential during period $T_{on}$ until Q2 is turned "off" at $T_2$. At time $T_2$, drain voltage $512_n$ begins to rise rapidly beyond the supply voltage of 14 V for a period of time due to the inductive flyback action at the drain terminal D of Q2. Q2 is then maintained in the "off" mode for at least the time period $T_{off}$. In the illustrated embodiment, transistor Q3 (FIG. 4) clamps drain voltage $512_n$ to 14.7 V (e.g., one diode voltage drop above the supply voltage) until the voltage $514_n$ stabilizes to the steady state level of the supply voltage $510_n$. Those skilled in the art will appreciate that element 422 pulls up node 350b to the supply voltage $510_n$. The embodiments, however, are not limited in this context.

Figure 6:
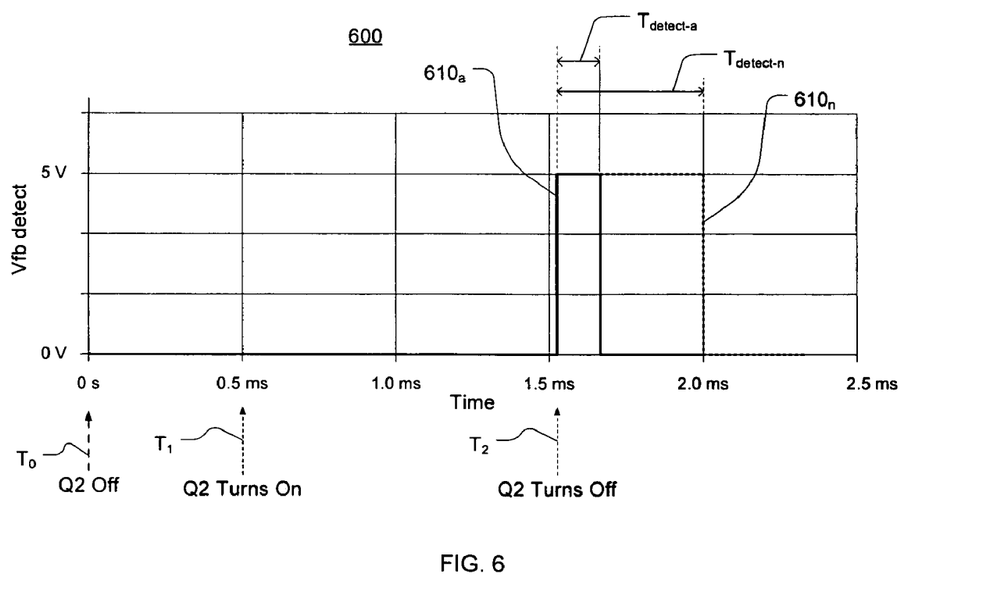
FIG. 6 graphically illustrates a waveform 600 associated with one embodiment of detection module 300.

FIG. 6 graphically illustrates a waveform 600 associated with one embodiment of detection module 300. With reference now to FIGS. 3-6, waveform 600 illustrates logic voltage pulses $610_a$ and $610_n$ at the $V_{fb\text{-}detect}$ output node 330 as a function of time. Both pulses $610_a$ and $610_n$ are shown relative to the times $T_1$ and $T_2$ when Q2 is turned "on" and "off," respectively. In the illustrated embodiment, pulse $610_a$ is the logic voltage pulse at the $V_{fb\text{-}detect}$ output node corresponding to an element with a first inductance. Logic voltage pulse $610_a$ is fed to control logic 320 via output node 330. In one embodiment, a pulse $610_a$ with a minimum threshold time period $T_{detect\text{-}a}$ is detected by control logic 320 as an element 422 having a first inductance at port 350. Accordingly, in one embodiment, if pulse $610_a$ is detected by control logic 320 for a minimum time period of $T_{detect\text{-}a}$ after the $T_{off}$ time period begins, sensor element 422 coupled to port 350 is detected as a type of sensor that has a first inductance. In one embodiment, sensor element 422 is a VRS sensor. In one embodiment, if pulse $610_a$ is detected by control logic 320 for less than the minimum threshold time period of $T_{detect\text{-}a}$ after the $T_{off}$ time period begins sensor element 422 is detected as a type of sensor with an inductance less than the first inductance. In one embodiment, this can represent a small inductance or no inductance. In one embodiment, for a pulse that is less than the minimum threshold time period of $T_{detect\text{-}a}$ the sensor type is a Hall sensor. In the illustrated embodiment, pulse $610_n$ has a time period of $T_{detect\text{-}n}$, which is greater than $T_{detect\text{-}a}$. A sensor element 422 with a time period of $T_{detect\text{-}n}$ is detected as a type of sensor that has a second inductance that is greater than the first inductance. Accordingly, this sensor element 422 is detected as a different type of inductive sensor.

Accordingly, in various embodiments, a time period greater than a predetermined minimum threshold time period $T_{detect\text{-}a}$ can be used to detect sensors with various inductances. Above the predetermined minimum threshold time period $T_{detect\text{-}a}$, the longer the time period the greater the inductance of the sensor element 422. A time period than is less than the predetermined minimum threshold time period $T_{detect\text{-}a}$ can be used to detect sensors with a small or no inductance. In other embodiments, any suitable number of $T_{detect}$ time periods can be used to detect any suitable number of types of sensors. The embodiments, however, are not limited in this context.

Figure 7:
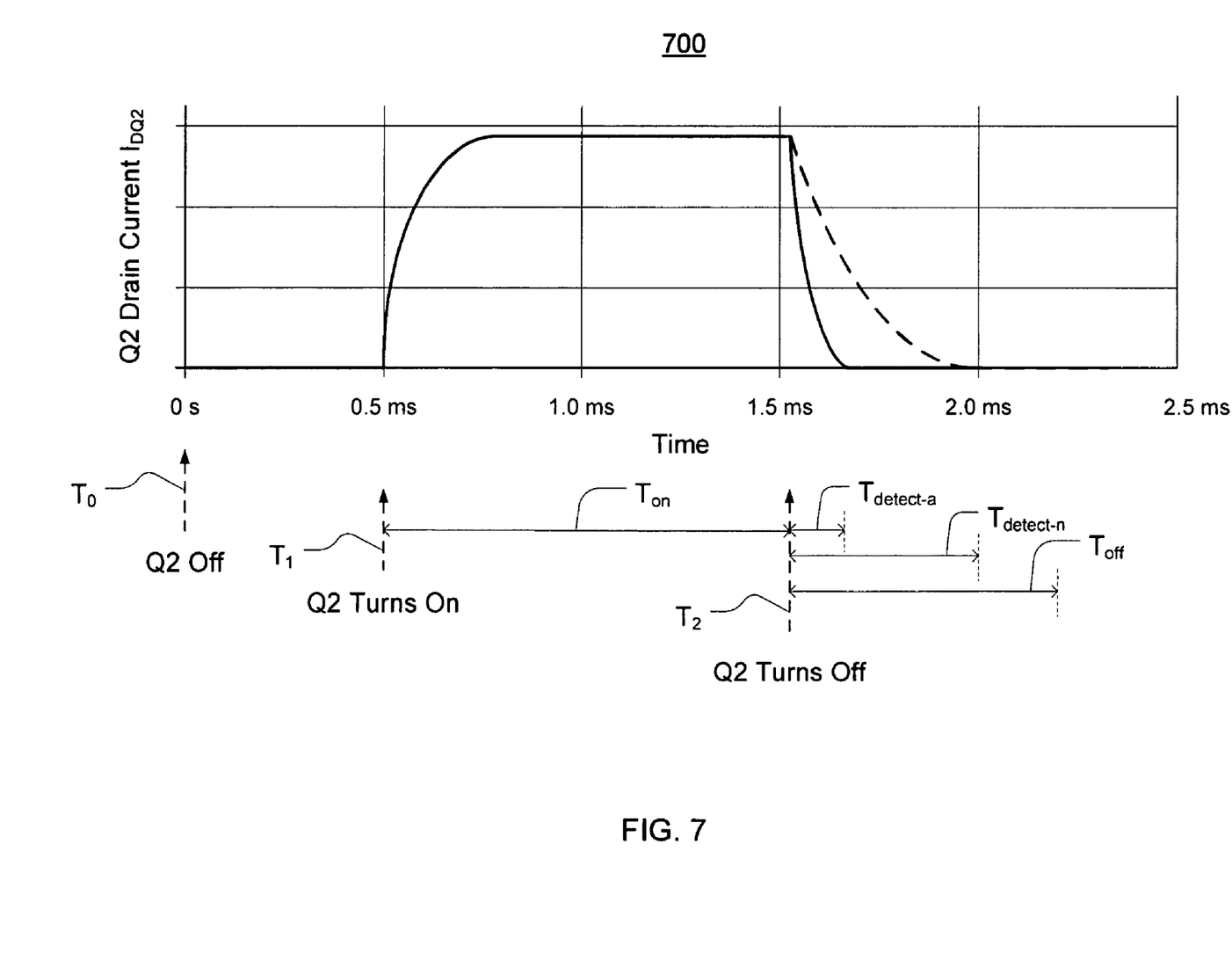
FIG. 7 graphically illustrates a waveform 700 associated with one embodiment of detection module 300.

FIG. 7 graphically illustrates a waveform 700 associated with one embodiment of detection module 300. With reference now to FIGS. 3-7, waveform 700 illustrates the drain current of Q2 $I_{DQ2}$, as a function of time along the horizontal axis. The timing along the horizontal axis is relative to the timing of waveforms 500 and 600 in FIGS. 5 and 6.

Figure 8:
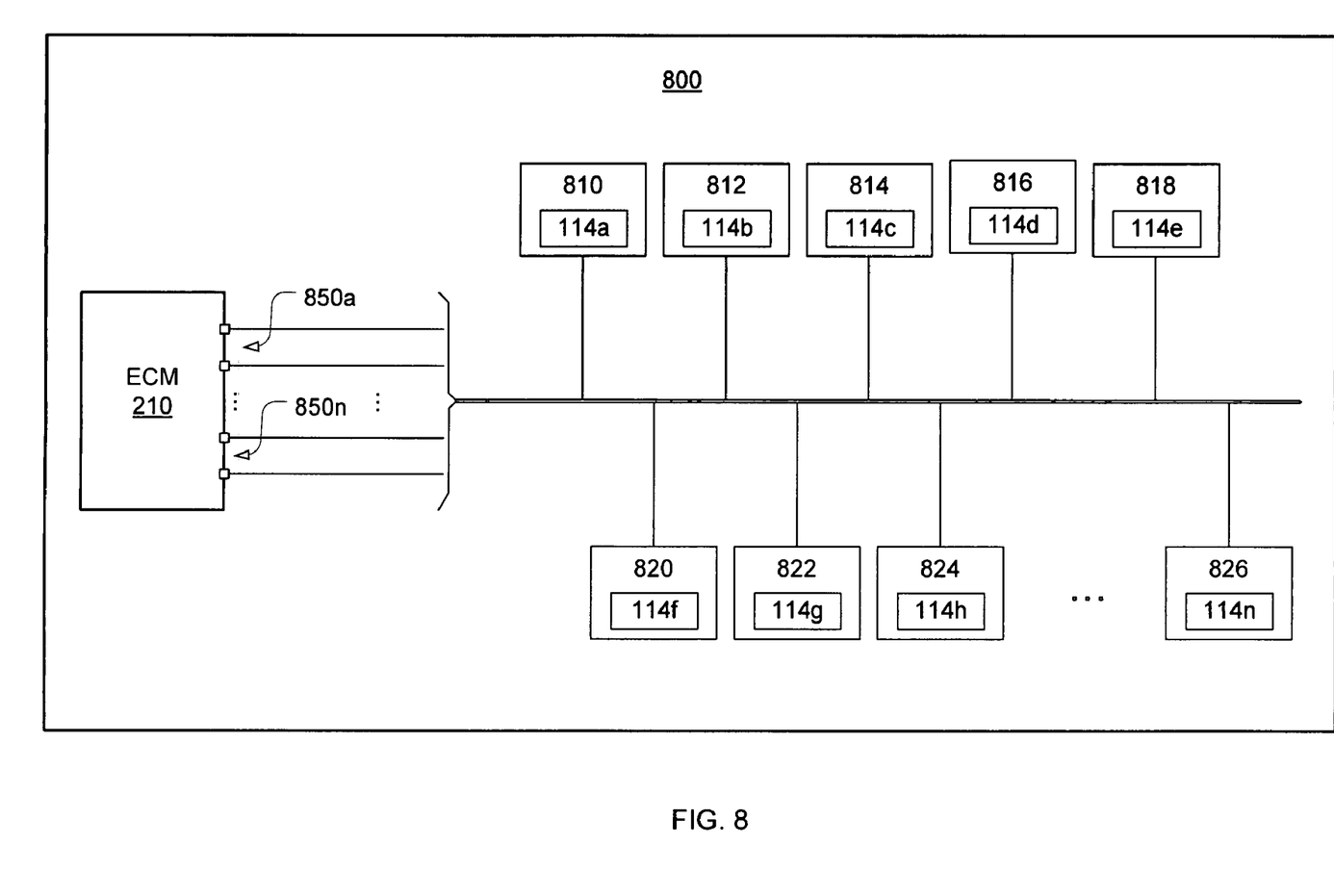
FIG. 8 illustrates one embodiment of a system 800.

FIG. 8 illustrates one embodiment of a system 800 comprising ECM 210 adapted to couple signals at multiple ports 850a-850n from multiple types of sensors 114a-114n. For example, in one embodiment, system 800 may be representative of any suitable type of vehicle such as an automobile, truck, motorcycle, snowmobile or recreational vehicle. In various embodiments, system 800 may comprise components such as a transmission 810, engine 812, one or more wheels 814, braking system 816, traction control 818, cooling system 820, injection system 822, and alarm system 824 and other suitable components 826. In other embodiments, system 800 includes other suitable vehicle or non-vehicle components.

In the illustrated embodiment, each component of system 800 comprises one or more sensors. In this embodiment, transmission 810 includes sensor 114a, engine 812 includes sensor 114b, one or more wheels 814 includes sensor 114c, braking system 816 includes sensor 114d, traction control 818 includes sensor 114e, cooling system 820 includes sensor 114f, injection system 822 includes sensor 114g, alarm system 824 includes sensor 114h, and other components 826 includes sensor 114n.

In various embodiments, sensors 114a-114n are used to detect physical attributes of system 800 such as component displacement, rotation, speed, and position relative to other components. In one embodiment, sensors 114a-114n are used to detect crank shaft rotation and position, engine speed and position, gear speed, automotive ignition system functions, the speed and direction of electronically controlled transmissions, and wheel speed for ABS and traction control systems. Sensors 114a-114n may also be used to measure other suitable variables such as vehicle oil pressure and internal temperature. In the illustrated embodiment, one or more sensors 114a-114n are connected to ECM 210. In one embodiment, ECM 210 automatically detects the type of sensor connected to any of its ports 850a-850n and couples one or more of the sensors 114a-114n to the appropriate interface 112a-112n in order to couple the sensor 114a-114n to control module 220.

Figure 9:
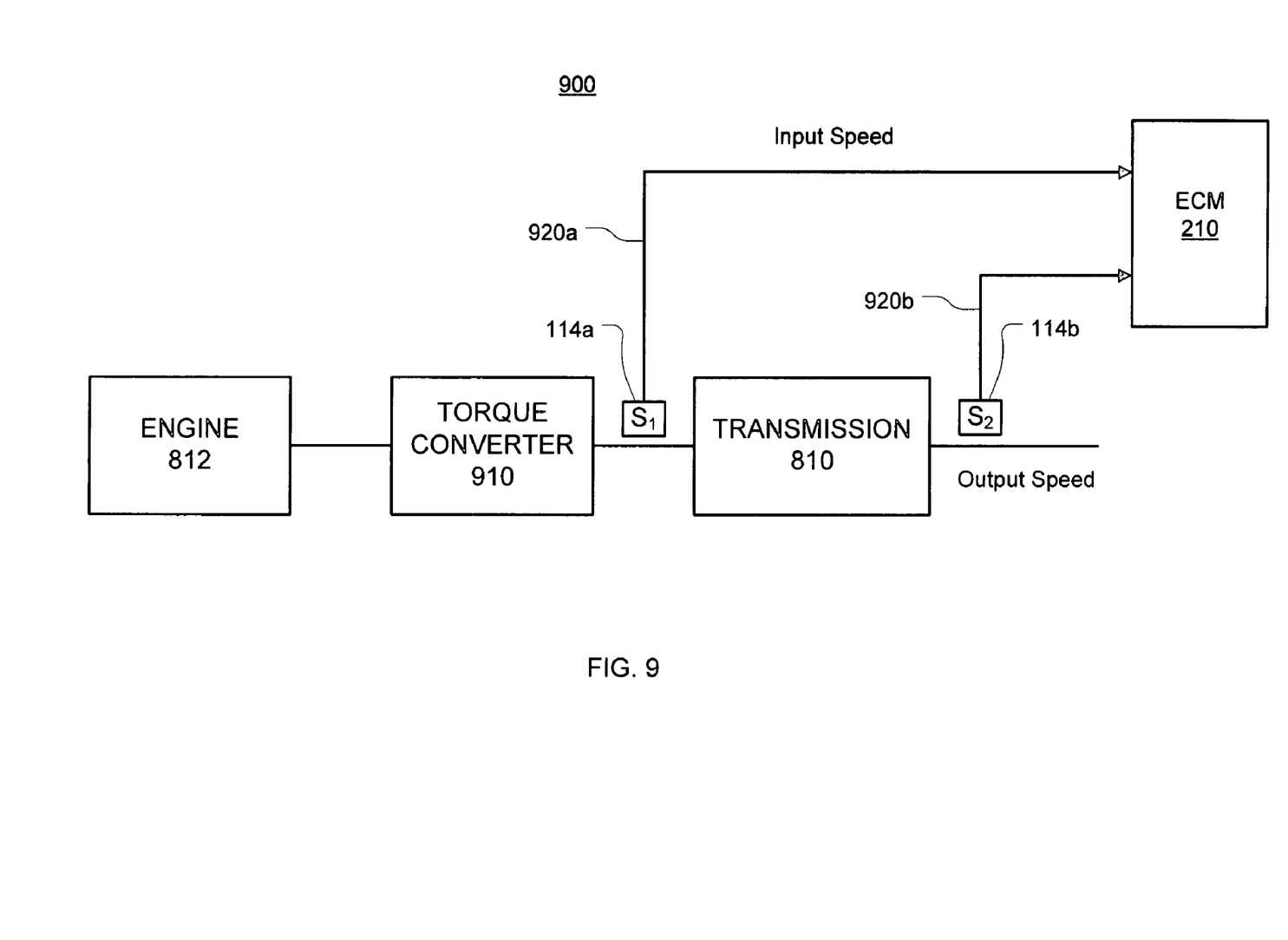
FIG. 9 illustrates one embodiment of a system 900.

FIG. 9 illustrates one embodiment of a system 900 comprising ECM 210 adapted to couple signals from transmission 810. In one embodiment, system 900 may comprise engine 812 coupled to a torque converter 910, which in turn may be coupled to transmission 810, for example. A first sensor $S_1$ (114a) is provided to sense input speed at path 920a of transmission 810. A second sensor $S_2$ is provided to sense output speed at path 920b of transmission 810. First and second sensors $S_1$ (114a) and $S_2$ (114b) coupled to ECM 210. In other embodiments, other suitable numbers of sensors 114a-114n may be coupled to ECM 210 using other suitable approaches.

Figure 10:
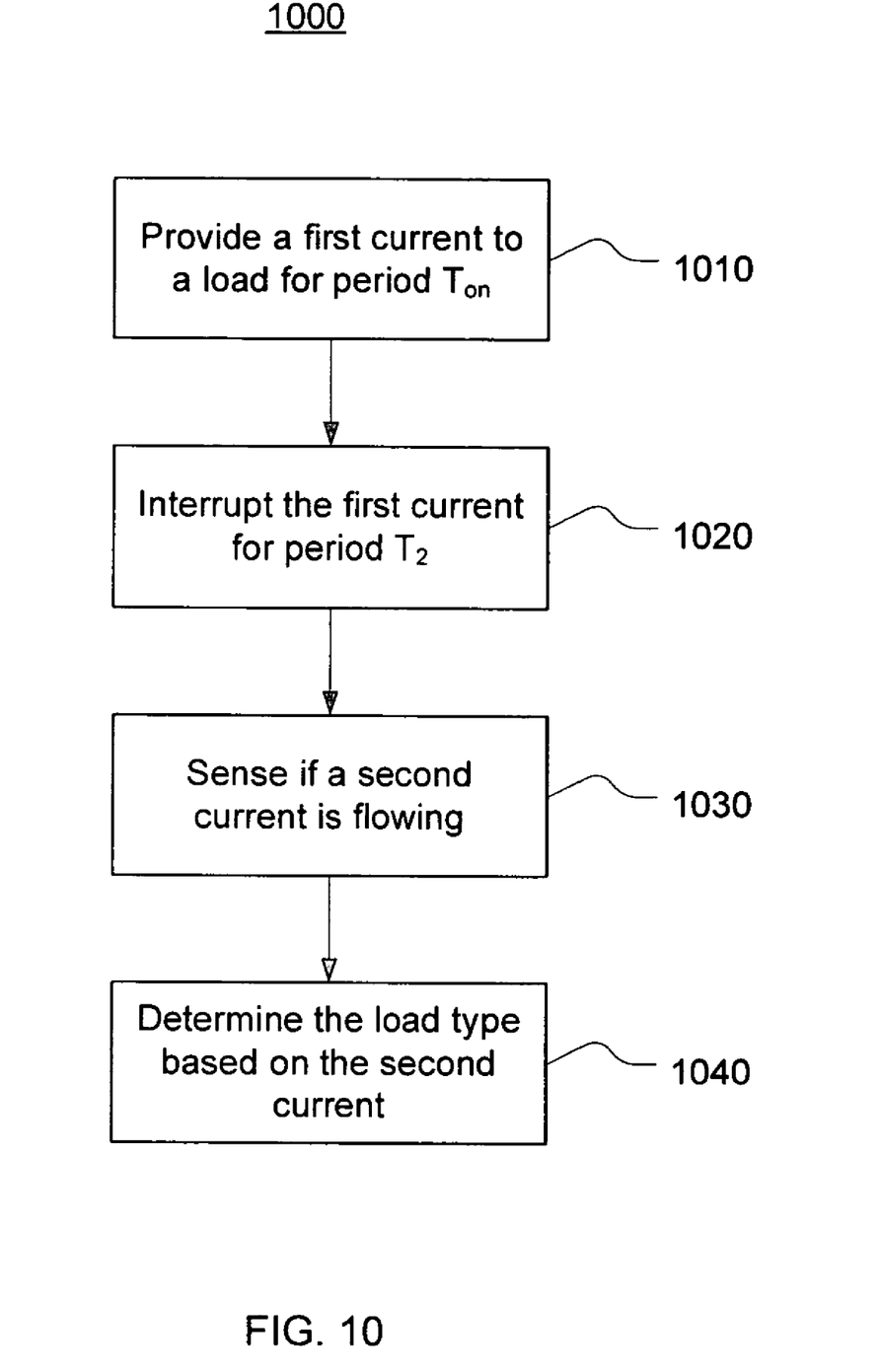
FIG. 10 illustrates one embodiment of a logic flow 1000.

FIG. 10 illustrates one embodiment of a logic flow 1000. Logic flow 1000 is representative of the operations executed by one or more systems described herein, such as system 200, 800, and 900 and/or modules 300 and 400. As shown in logic flow 1000, when Q1 turns on, a first current is provided to a load for a period $T_{on}$ (1010). In various embodiments, $T_2$ can have any suitable value such as zero or a value greater than zero. Next, the first current is interrupted for a period $T_2$ (1020). Sense module 400 senses if a second current is flowing (1030). In other embodiments, sense module 400 can sense other suitable attributes such as a voltage. Detection module 300 determines the load type based on the second current (1040). In one embodiment, if the second current is at least a minimum value for a minimum period of time, detection module 300 provides a first control word 222 to selection module 230 to select a first interface 112*a-n* associated with the load and then couples the load to conditioning module 240 via the selected first interface. In one embodiment, if the second current is not at least a minimum value for a predetermined period of time, detection module 300 provides a second control word 222 to selection module 230 to select a second interface 112*a-n* associated with the load and then couple the load to a conditioning module 240 via the selected second interface.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired speed, power levels, heat tolerances, semiconductor manufacturing processing, input rates, output rates, memory resources, and other performance constraints.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true scope of the embodiments.

The invention claimed is:

1. An apparatus, comprising:
    a first and second node configured to couple to a load;
    a current source adapted to drive a first current to the load through at least one of the first and second nodes;
    a first switch coupled to the at least one of the first and second nodes, wherein the first switch is adapted to interrupt the first current; and
    a sense circuit configured to monitor whether a second current is provided by the load after the first current is interrupted, wherein the sense circuit provides an output that corresponds to a value of the second current and that indicates a type of the load.

2. The apparatus of claim 1, wherein if the second current is provided by the load for at least a first time period, the type of the load is detected as a load having a first inductance.

3. The apparatus of claim 2, wherein the type of the load comprises a variable reluctance sensor (VRS).

4. The apparatus of claim 2, wherein if the second current is provided by the load for a second time period that is greater than the first time period, the type of the load is detected as a load having a second inductance which is greater than the first inductance.

5. The apparatus of claim 2, wherein if the second current is provided by the load for a third time period that is less than the first time period, the type of the load is detected as a load having a third inductance that is less than the first inductance.

6. The apparatus of claim 5, wherein the third inductance is approximately zero.

7. The apparatus of claim 6, wherein the type of load comprises a Hall-effect sensor.

8. A system, comprising:
    a detection module comprising a port to receive a load, the detection module to detect the type of load coupled to the port based on a detection voltage generated in response to current driven by the load when current driven to the load is interrupted; and
    a selection module coupled to the detection module to couple an interface to the load based on the type of load detected by the detection module.

9. A system, comprising:
    a detection module comprising a port to receive a load, the detection module to detect the type of load coupled to the port; and
    a selection module coupled to the detection module to couple an interface to the load based on the type of load detected by the detection module, wherein the detection module comprises:
    a first and second node configured to couple to the load;
    a current source adapted to drive a first current to the load through at least one of the first and second nodes;
    a first switch coupled to the at least one of the first and second nodes, wherein the first switch is adapted to interrupt the first current; and
    a sense circuit configured to monitor whether a second current is provided by the load after the first current is interrupted, wherein the sense circuit provides an output that corresponds to a value of the second current and that indicates a type of the load.

10. The system of claim 9, wherein if the second current is provided by the load for at least a first time period, the type of the load is detected as a load having a first inductance.

11. The system of claim 9, wherein if the second current is provided by the load for a second time period that is greater than the first time period, the type of the load is detected as a load having a second inductance which is greater than the first inductance.

12. The system claim 9, wherein if the second current is provided by the load for a third time period that is less than the first time period, the type of the load is detected as a load having a third inductance that is less than the first inductance.

13. A vehicle, comprising:
    a sensor;
    a detection module comprising a port to receive the sensor, the detection module configured to detect the type of sensor coupled to the port based on a detection voltage generated in response to current driven by the sensor when current driven to the sensor is interrupted; and a selection module coupled to the detection module and adapted to couple an interface to the sensor based on the type of sensor detected by the detection module.

14. A vehicle, comprising:
a sensor;
a detection module comprising a port to receive the sensor, the detection module configured to detect the type of sensor coupled to the port; and
a selection module coupled to the detection module and adapted to couple an interface to the sensor based on the type of sensor detected by the detection module, wherein the detection module comprises:
a first and second node configured to couple to the sensor;
a current source adapted to drive a first current to the sensor through at least one of the first and second nodes;
a first switch coupled to the at least one of the first and second nodes, wherein the first switch is adapted to interrupt the first current; and
a sense circuit configured to monitor whether a second current is provided by the sensor after the first current is interrupted, wherein the sense circuit provides an output that corresponds to a value of the second current and that indicates a type of the sensor.

15. The vehicle of claim 14, wherein if the second current is provided by the sensor for at least a first time period, the type of the sensor is detected as a sensor having a first inductance.

16. The vehicle of claim 14, wherein if the second current is provided by the sensor for a second time period that is greater than the first time period, the type of the sensor is detected as a sensor having a second inductance which is greater than the first inductance.

17. The vehicle of claim 14, wherein if the second current is provided by the sensor for a third time period that is less than the first time period, the type of the sensor is detected as a sensor having a third inductance that is less than the first inductance.

18. A method, comprising:
providing a first current to a load;
interrupting the first current;
sensing a second current; and
determining a type of the load based on the second current.

19. The method of claim 18, comprising detecting the type of the load as a load having a first inductance if the second current is sensed for at least a first time period.

20. The method of claim 18, comprising detecting the type of the load as a load having a second inductance that is greater then the first inductance if the second current is sensed for a second time period that is greater than the first time period.

21. The method of claim 18, comprising detecting the type of the load as a load having a third inductance that is less than the first inductance if the second current is sensed for at least a third time period that is less than the first time period.

22. A method, comprising:
detecting a type of load coupled to a port based on a detection voltage generated in response to current driven by the load when current driven to the load is interrupted; and
coupling an interface to the load based on the type of load.

23. A method, comprising:
detecting a type of load coupled to a port; and
coupling an interface to the load based on the type of load, wherein the detecting comprises:
driving a first current through the load;
interrupting the first current; and
sensing a second current when the first current is interrupted.

24. The method of claim 23, wherein if the second current is sensed for a first time period, detecting the load as a sensor with a first inductance; and
wherein if the second current is sensed for a second time period that is greater than the first time period, detecting the load as a sensor with a second inductance, wherein the second inductance is greater than the first inductance; and
wherein if the second current is sensed for a third time period less than the first time period, detecting the load as a sensor with a third inductance, wherein the third inductance is less than the first inductance.

25. An apparatus, comprising:
means for detecting a type of load coupled to a port based on a detection voltage generated in response to current driven by the load when current driven to the load is interrupted; and
means for coupling an interface to the load based on the type of the load.

26. The apparatus of claim 25, wherein the means for detecting comprises means for sensing the current driven by the load.

27. An apparatus, comprising:
means for detecting a type of load coupled to a port; and
means for coupling an interface to the load based on the type of the load,
wherein the means for detecting comprises means for sensing a second current driven by the load,
wherein if the second current is sensed for a first time period, the load is detected as a load having a first inductance; and
wherein if the second current is sensed for a second time period that is greater than the first time period, the load is detected as a load having a second inductance, wherein the second inductance is greater than the first inductance; and
wherein if the second current is sensed for a third time period that is less than the first time period, the load is detected as a load having a third inductance, wherein the third inductance is less than the first inductance.

* * * * *